(12) United States Patent
Hewlett et al.

(10) Patent No.: US 9,772,497 B1
(45) Date of Patent: Sep. 26, 2017

(54) CUSTOMIZED VIEWING SYSTEM FOR AN OPTICAL DEVICE

(71) Applicants: Robert Troy Hewlett, Cumming, GA (US); Jonathan Michael Butler, Gainesville, GA (US)

(72) Inventors: Robert Troy Hewlett, Cumming, GA (US); Jonathan Michael Butler, Gainesville, GA (US)

(*) Notice: Subject to any disclaimer, the term of this patent is extended or adjusted under 35 U.S.C. 154(b) by 0 days.

(21) Appl. No.: 15/274,905

(22) Filed: Sep. 23, 2016

(51) Int. Cl.
  *G02C 1/00* (2006.01)
  *G02B 27/02* (2006.01)
  *G02B 25/00* (2006.01)
  *G02C 11/00* (2006.01)

(52) U.S. Cl.
  CPC ......... *G02B 27/022* (2013.01); *G02B 25/001* (2013.01); *G02B 27/028* (2013.01); *G02C 11/00* (2013.01)

(58) Field of Classification Search
  CPC .............. G02C 1/00; G02B 2027/0123; G02B 2027/0134; G02B 2027/0147; G02B 2027/0178; G02B 27/017
  USPC ................. 351/158, 62, 47, 57, 41; 359/630
  See application file for complete search history.

(56) References Cited

U.S. PATENT DOCUMENTS

| | | |
|---|---|---|
| 2,647,438 A | 8/1953 | Milne et al. |
| 4,395,731 A | 7/1983 | Schoolman |
| 4,565,428 A | 1/1986 | Arndt et al. |
| 4,834,525 A * | 5/1989 | Vansaghi ............... G02B 7/002 351/158 |
| 5,341,513 A | 8/1994 | Klein et al. |
| 5,694,650 A | 12/1997 | Hong |
| 6,761,447 B1 | 7/2004 | Pyo |
| 6,827,577 B1 | 12/2004 | Fulbrook |
| 7,648,234 B2 * | 1/2010 | Welchel ................ G02C 11/08 351/62 |
| 8,899,743 B2 * | 12/2014 | Kikuyama ............. G02C 11/08 351/62 |
| 8,955,168 B2 | 2/2015 | Manzella, Jr. et al. |
| 2008/0120763 A1 | 5/2008 | Clark |
| 2011/0145978 A1 | 6/2011 | Harbin |
| 2015/0143619 A1 | 5/2015 | Cross |
| 2015/0250971 A1* | 9/2015 | Bachelder ......... A61M 16/0616 128/205.25 |
| 2015/0297311 A1 | 10/2015 | Tesar |
| 2015/0377462 A1 | 12/2015 | Wilt et al. |

FOREIGN PATENT DOCUMENTS

DE  2632663  1/1978

* cited by examiner

*Primary Examiner* — Hung Dang
(74) *Attorney, Agent, or Firm* — Joseph S. Bird, III; Bradley Arant Boult Cummings LLP

(57) ABSTRACT

A customized viewing system for an optical device to alleviate back and neck strain.

10 Claims, 3 Drawing Sheets

CUSTOMIZED VIEWING SYSTEM FOR AN OPTICAL DEVICE

Optical devices such as microscopes, video games, and virtual reality devices provide an image or series of images to a user. In order to take utmost advantage of the images provided by the optical device, prior to this invention, the user often put himself into a position which was uncomfortable either in the short term or the long term.

For example, the binoculars for a surgical microscope transmit two images, one for each eye, to the user. Binoculars have two eyepieces which normally comprise plastic or metal eyecups which can make contact with the user's eye socket. Although these types of binoculars with eyepieces have been in existence for very long, there are numerous practical difficulties experienced by the users.

The eyepieces of the optical systems are normally configured and attached to the optical system in a manner which does not allow the user's head to rest on them. The user is often required to view into the eyepieces of binoculars (or a single eyepiece for a monocular device) for extended periods such as during a surgical procedure. With prior art eyepieces, the microscope user can experience neck and back strain from using neck and back muscles and the spine to stabilize the head during long periods of time using the optical system. With prior art binoculars or monoculars with eyepieces, users are unable to lean against the plastic or metal eye cups. Many optical device users are unable to continue their careers when problems caused by neck and back strain accumulate from years of optical system use, and these kinds of problems can be experienced by any user of optical devices.

The visual images produced for the user by the current eyepieces are not always ideal. That is, the optical environment for the user, comprising pupillary distance (PD), refractive lens correction, and the length of the focal image plane (eye relief), is highly variable from individual to individual. For instance, a user's PD varies depending on the size of the user's face. Also, optical device users often have vision which is corrected by refractive lenses, and adjustable diopters are provided in prior art binoculars with eyepieces, but these can be difficult or impractical to adjust during or even between surgeries. Finally, the distance between the user's cornea and the eyepiece lens (eye relief) affects the user's experience also. The user must hold his head steady in space to find the best image, and this in turn will create neck or back strain as the user attempts to hold her head steady in space in a fixed position. The foregoing conditions mean that achieving the best optical environment takes a great deal of adjustment and generally leads to neck and back strain. Thus, there are many practical deficiencies with current optical device binoculars and monoculars with eyepieces which create challenges for delivering the best visual image, and maintaining the health of the user's neck and back.

The present invention provides a new customized viewing system for using optical systems.

DETAILED DESCRIPTION

Figure 1:
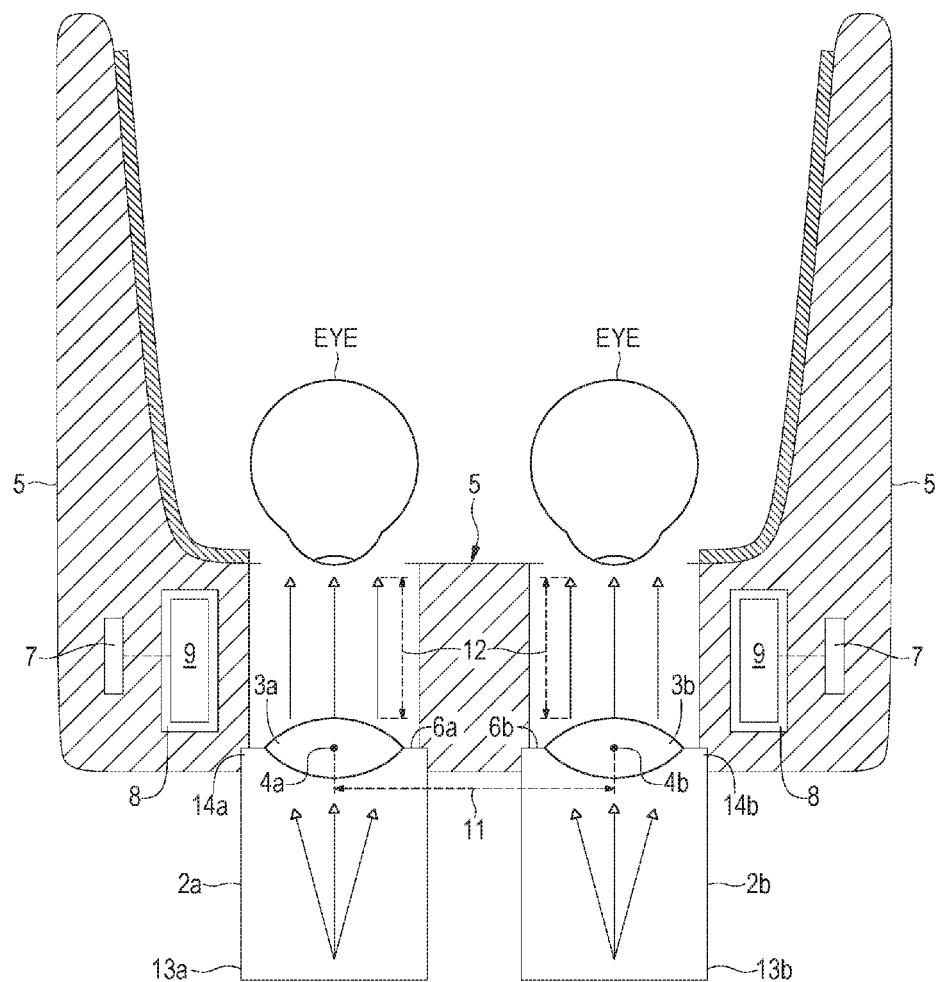
FIG. 1 is a section view of the embodiment of the invention comprising eyepieces and includes a schematic of the pathway of light beams to the eyes from the optical device.

The invention 1 is a customized system for attachment to an optical device, such as a microscope, a video game, or a virtual reality device. The invention incorporates preset values obtained from measurements of the user's face which are built into the structure of the system, in order to minimize practical difficulties in using adjustable settings and also to reduce or eliminate strain to the neck and back of the user, and to solve other problems described herein.

In one embodiment, the viewing system for attachment to an optical device 15 comprises two eyepieces 2a, 2b secured by any of a number of mechanical means to a mask 5 which comprises two eyepiece openings 6a, 6b. The mask is customized to the size and shape of a user's face. An eyepiece comprises at least one rigid sidewall in any practical shape (e.g., round, square, oval and the like) and at least one optical element for transmitting light beams from the optical device to the user's eye. Each said eyepiece also comprises a first end 13a, 13b and a second end 14a, 14b the first end of each said eyepiece being fitted for attachment to an optical device and the second end being attached to a mask 5, and each said eyepiece comprises a lens 3a, 3b located near the second end 14a, 14b and each said lens 3a, 3b having a center 4a, 4b, said center of each said lens being spaced in relation to the center of the other said lens at a distance similar to a measured pupillary distance (PD) 11 of the user. Each said lens also being positioned at an optimal eye relief distance 12, such that the user can rest his or her face against the mask and thereby prevent neck and back strain.

In one embodiment, the invention comprises a pair of lenses 3a, 3b, one for each eye, which are selected to correspond to the user's prescription lenses or, if no prescription is needed, the eyepieces are set to plano. Each lens 3a, 3b has a center 4a, 4b upon which the user may center the pupils of the eyes. Each lens is seated or secured near the second end 14a, 14b of each eyepiece, which can also be described as the ends of the eyepieces closest to the user. Pupillary distance 11 is the distance between the centers of the user's pupils. The retina has a preferential area for resolving images with small details and, for the best vision, light should be focused on those areas. In order to deliver the optimal image to the user's retina, the image delivered to the eye should be in focus at the user's cornea so that the image may be delivered optimally through each pupil and lens of the eye to the retina. The lenses 3a, 3b are also placed at a customized distance from the user's cornea so that the light passing through forms an optimum image on the user's retina, and the image is clearest, as shown in FIG. 1. That is, the invention is customized to place the user's cornea on the same plane as the eye relief 12 produced by each eyepiece. The customized eye relief distance is determined by the dimensions and shape of the user's face, as measured from the user himself, particularly the inset of the eyes and their position relative to the rest of the user's face.

Figure 2A:
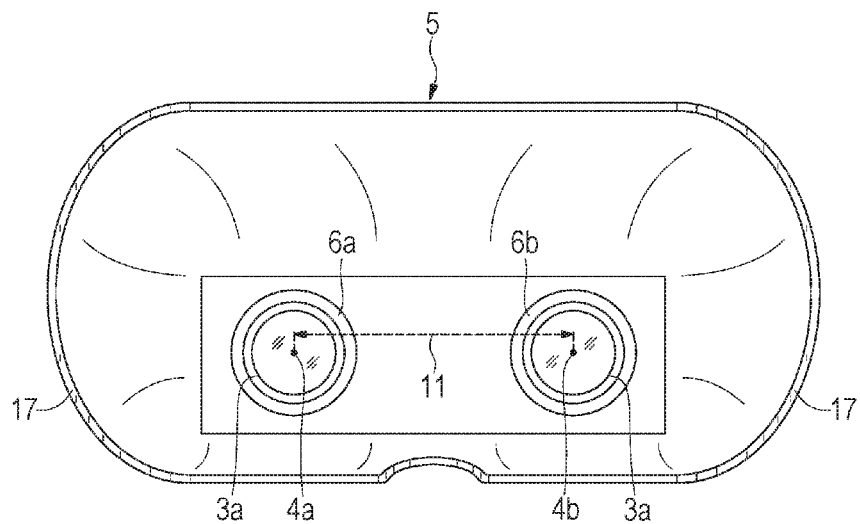
FIG. 2A is a view from the inside of the mask towards eyepieces secured to the mask in the embodiment without cutouts on either side.
Figure 2B:
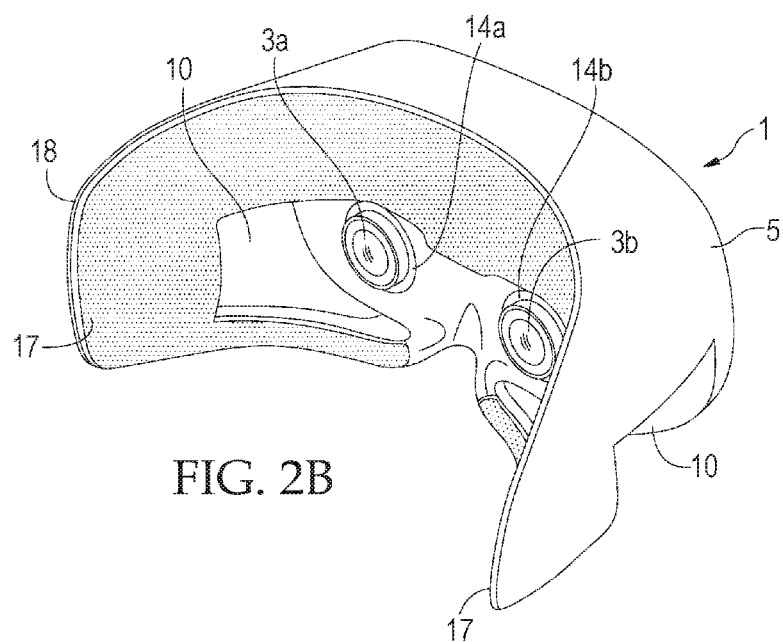
FIG. 2B is a perspective view from the rear and side of the invention in the embodiment with cutouts but without windows in place.
Figure 3:
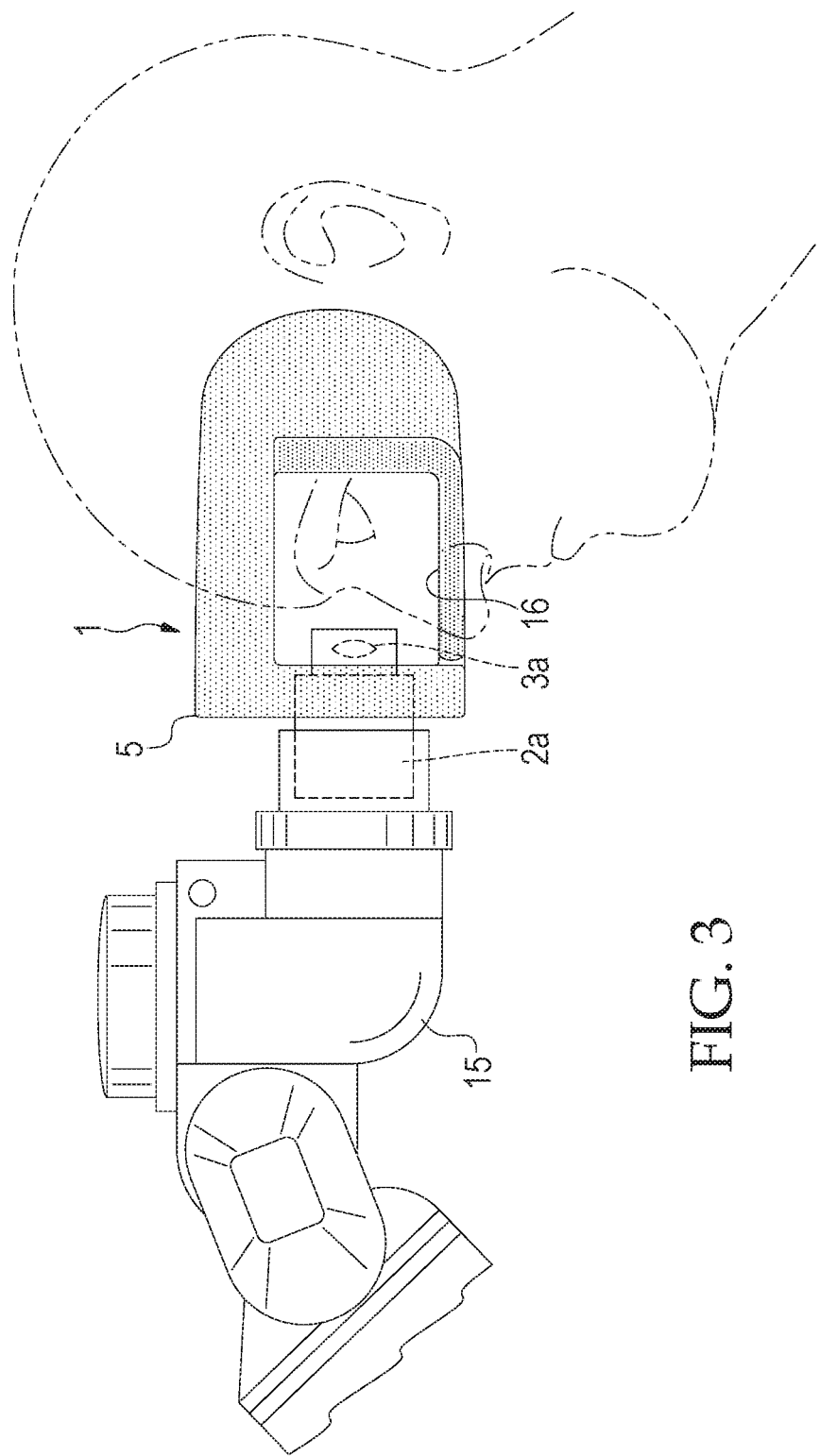
FIG. 3 is a side view of the invention comprising eyepieces, and said eyepieces being secured to an optical device. A window covering a cutout is depicted.

In one embodiment, the centers 4a, 4b of the lenses 3a, 3b in the invention are located relative to one another, that is, they are spaced at a distance which is a particular user's PD as measured from the user, as PD 11 is shown in FIGS. 1 and 2. The lenses 3a, 3b are also customized to carry the refractive prescription for the user's eyes. The invention further comprises a mask 5 which secures the two eyepieces 2a, 2b in eyepiece openings 6a, 6b one for each eyepiece. The mask 5 is positioned so that the user can rest his or her head completely on the mask, thus eliminating neck and back strain. The mask is not worn by the user but is attached to the optical device. The mask 5 can be in any shape as long as it provides a place for the head to rest during usage, and the mask can be made of any material which is strong enough to secure the eyepieces substantially in the same plane. In one embodiment, the mask may be composed of a polymer which is formed by a 3D printer communicating with a camera enabled to produce 3D images of the face. In another embodiment, the mask can be produced by the older method of taking a plaster mold of the face and then producing a plastic structure therefrom. In one embodiment, a chin rest may also be provided. In another embodiment, padding 17 of relatively soft material such as closed cell foam or rubber is attached to the border 18 of the mask 5 which would contact the user's face.

The drying of the user's eyes from the air flow typical in a surgical environment is a problem which often requires a user to administer wetting drops to the eyes frequently. Another factor producing dry eyes is that, at certain points, the user might blink the eyes much less frequently to avoid missing any action or developments, and so this retards the eyes' ability to moisten themselves by blinking. In one embodiment, the mask 5 has a cutout 10 on each side so that the user can use peripheral vision. To solve the dry eye problems which might occur in the embodiment with cutouts 10, the cutouts may be enclosed with a window 16 comprising clear plastic or glass which allows the user peripheral vision and also maintains a closed chamber which is the space between the mask and the user's face. The user's face is pressed against the mask, thereby shielding the eyes from the air flow typical in a surgical environment, and to retain a moister environment for the eyes.

The warm moisture retained between the invention and the user's face, though, can create a problem of condensation on the eyepieces if the environment of use, for example in surgery, is cool. In one embodiment the mask comprises at least one battery or other power source 7, optionally housed in a cavity 8 in the mask, for powering circuitry to operate at least one heating element 9 for the eyepieces. Many environments are cool where the invention is used, such as operating rooms, and heating the eyepieces prevents condensation from forming on the eyepiece lenses.

The eyepieces 2a, 2b may be connected to an optical device such as a microscope through any mechanical means such as threading, clips, screws or also through magnetic force.

In one embodiment, the invention comprises a mask 5 comprising two eyepiece openings 6a, 6b. The mask is customized to the size and shape of a user's face, and each said eyepiece opening 6a, 6b is configured for attachment to an eyepiece of an optical device. Each said eyepiece opening has a center 4a, 4b and is spaced in relation to the center of the other said eyepiece opening 6a, 6b at a distance similar to a measured pupillary distance of the user. Each said eyepiece opening is also configured so that a lens 3a, 3b of an eyepiece of an optical device is at an optimal eye relief distance 12 for the user, that is, the image from the optical device is optimally focused at the user's cornea. As a result of the foregoing, the user can rest his or her face against the mask and thereby prevent neck and back strain. In this embodiment, the eyepieces are not provided and the invention attaches to eyepieces which are part of an optical device. In this embodiment, the center of an eyepiece opening is the point at which a center of a lens on an eyepiece of the optical device is located when the invention is attached to an optical device.

In another embodiment, the optical device may be one or more screens projecting an image as in a video game or a virtual reality device.

In another embodiment the optical device can be the optical components of a weapon or weapon system.

In another embodiment, the optical device can be monocular such as in certain laboratory microscopes. In such a monocular embodiment, only one eyepiece can be inserted into an eyepiece opening 6a, 6b.

We claim:

1. A customized viewing system for an optical device, said system comprising two eyepieces secured to a mask, said mask comprising two eyepiece openings and being customized to a user's face, each said eyepiece comprising a first end and a second end, the first end of each said eyepiece being fitted for attachment to the optical device and the second end of each of the eyepieces being attached to one of the eyepiece openings, and each said eyepiece further comprising a lens located near the second end and each said lens having a center, said center of each said lens being spaced in relation to the center of the other said lens at a distance similar to a measured pupillary distance of the user, each said lens also being positioned at an optimal eye relief distance, such that the user can rest his face against the mask and thereby prevent neck and back strain.

2. The system as in claim 1, wherein each said lens comprises a refractive prescription for one of the user's eyes.

3. The system as in claim 1, further comprising a heater for warming the eyepieces.

4. The system as in claim 1, wherein the mask further comprises a cutout on each side which enables the user to see with peripheral vision.

5. The system as in claim 4, further comprising a window enclosing each of the cutouts, each said window retaining moisture between the mask and the user's face during use of the system.

6. The system as in claim 1, wherein the mask is customized by imaging the user's face and exporting images of the user's face to a 3D printer.

7. A customized viewing system for an optical device, said system comprising a mask comprising two eyepiece openings and said mask being customized to a user's face, each said eyepiece opening configured for attachment to an eyepiece of the optical device, and each said eyepiece opening having a center and being spaced in relation to the center of the other said eyepiece opening at a distance similar to a measured pupillary distance of the user, each said eyepiece opening also configured so that a lens of each eyepiece is at an optimal eye relief distance for the user, such that the user can rest his or her face against the mask and thereby prevent neck and back strain.

8. The system as in claim 7, wherein the mask further comprises a cutout on each side which enables the user to see with peripheral vision.

9. The system as in claim 8, further comprising a window enclosing each of the cutouts, each said window retaining moisture between the mask and the user's face during use of the system.

10. The system as in claim 7, wherein the mask is customized by imaging the user's face and exporting images of the user's face to a 3D printer.

\* \* \* \* \*